May 4, 1965  J. M. MILLER  3,181,618
ELECTRONIC COTTON CHOPPER
Filed Jan. 4, 1962  7 Sheets-Sheet 1

John M. Miller
INVENTOR.

May 4, 1965 J. M. MILLER 3,181,618
ELECTRONIC COTTON CHOPPER
Filed Jan. 4, 1962 7 Sheets-Sheet 2

John M. Miller
INVENTOR.

BY *Clarence A. O'Brien*
*and Harvey B. Jacobson*
Attorneys

May 4, 1965   J. M. MILLER   3,181,618
ELECTRONIC COTTON CHOPPER
Filed Jan. 4, 1962   7 Sheets-Sheet 3

John M. Miller
INVENTOR.

May 4, 1965   J. M. MILLER   3,181,618
ELECTRONIC COTTON CHOPPER
Filed Jan. 4, 1962   7 Sheets-Sheet 6

John M. Miller
INVENTOR.

May 4, 1965  J. M. MILLER  3,181,618
ELECTRONIC COTTON CHOPPER
Filed Jan. 4, 1962  7 Sheets-Sheet 7

Fig. 18A

John M. Miller
INVENTOR.

BY *Lawrence A. O'Brien*
*and Harvey B. Jacobson*
Attorneys

United States Patent Office 3,181,618
Patented May 4, 1965

3,181,618
ELECTRONIC COTTON CHOPPER
John M. Miller, 123 W. Ash St., Blytheville, Ark.
Filed Jan. 4, 1962, Ser. No. 164,294
16 Claims. (Cl. 172—6)

This invention relates to plant chopper assemblies adapted to be mounted on tractor vehicles for movement between rows of plants for the purpose of selectively thinning plant rows and/or clearing vegetation, leaving plants spaced apart a predetermined distance.

A primary object of the present invention is to provide a chopper assembly which is operative under electronic controls to more accurately and reliably remove plants and subsequently vegetation in a row leaving uniformly spaced plants so as to facilitate growth thereof.

Another object of the present invention is to provide a chopping assembly capable of achieving the aforementioned objectives without reliance upon any ground engaging spacing device which would fail to take into account the variable spacing between plants in a row prior to thinning of the plants.

A further object of this invention is to provide a plant chopping assembly especially adapted for cotton plants which achieves the aforementioned objectives by use of a structurally novel arrangement of parts inherently capable of operating for longer periods of time without repair or replacement of the parts thereof.

An additional object of this invention is to provide a plant chopping assembly exercising accurate and reliable plant thinning controls by use of a novel control circuit arrangement capable of rechopping after thinning to remove unwanted vegetation growth thereafter.

In accordance with the foregoing objects, the plant chopping assembly of the present invention is mounted forwardly of a tractor vehicle and moves in parallel spaced relation between rows of plants.

Disposed on opposite sides of a plant row, are a pair of chopper head assemblies which are spaced from each other a short distance so as to enable the assemblies to chop plants both forwardly of and rearwardly of selected plants and without any limitations on the height of the plants. The chopping head assemblies are accordingly displaceable across a plant row with continuously movable rigid cutter blades for plant chopping purposes. In order to control the extension and retraction of the chopping head assemblies so as to clear the plants both forwardly and rearwardly of selected plants spaced a preselected distance apart, a spacing count photocell assembly is mounted a predetermined distance forwardly of the chopping head assemblies. The photocell assembly is therefore periodically operative to control the extension and retraction of the chopping head assemblies through a spacing control device which controls the programmed phase spacing of the chopping head assemblies for proper sequential operation. The spacing control assembly may be either in the form of an odometer operative to provide counting signals in response to predetermined displacement of the vehicle relative to the ground or alternatively, a scanning assembly may be utilized which issues counting signals in response to relative movement between the vehicle and plants. Associated with the scanning assembly are facilities for varying the spacing between selected plants to compensate for any substantially non-uniform spacing between the plants prior to thinning that could leave gaps in the row should the phase spacing of the programmed cycle remain unchanged.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 8:
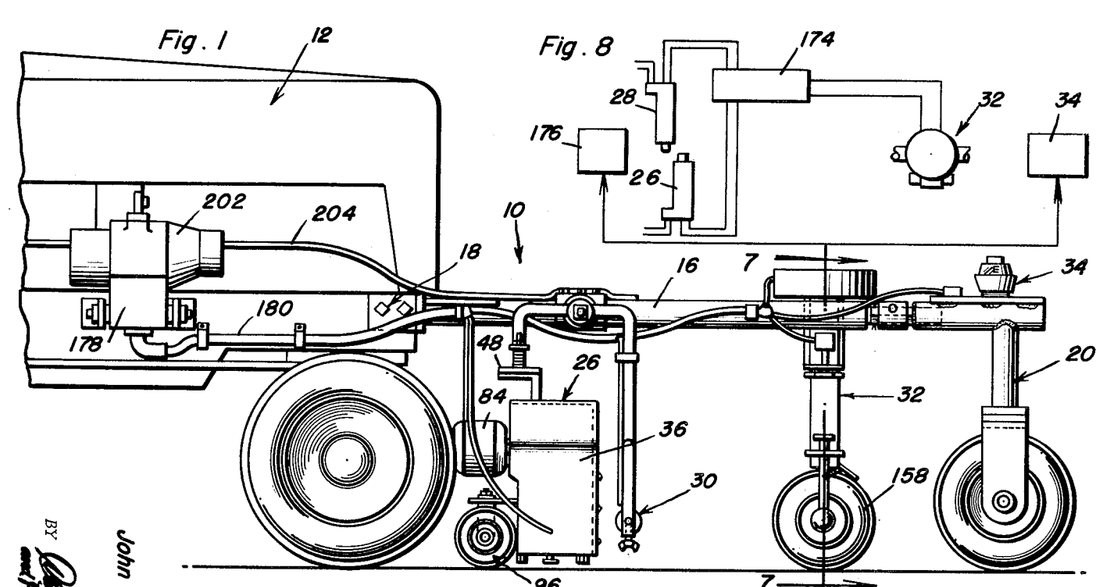
FIGURE 1 is a side elevational view of one form of cotton chopping assembly shown mounted on a tractor vehicle.
FIGURE 8 is a diagrammatic view of the control system associated with the cotton chopper illustrated in FIGURES 1 through 7.
Figures 2, 9, 14, 15:
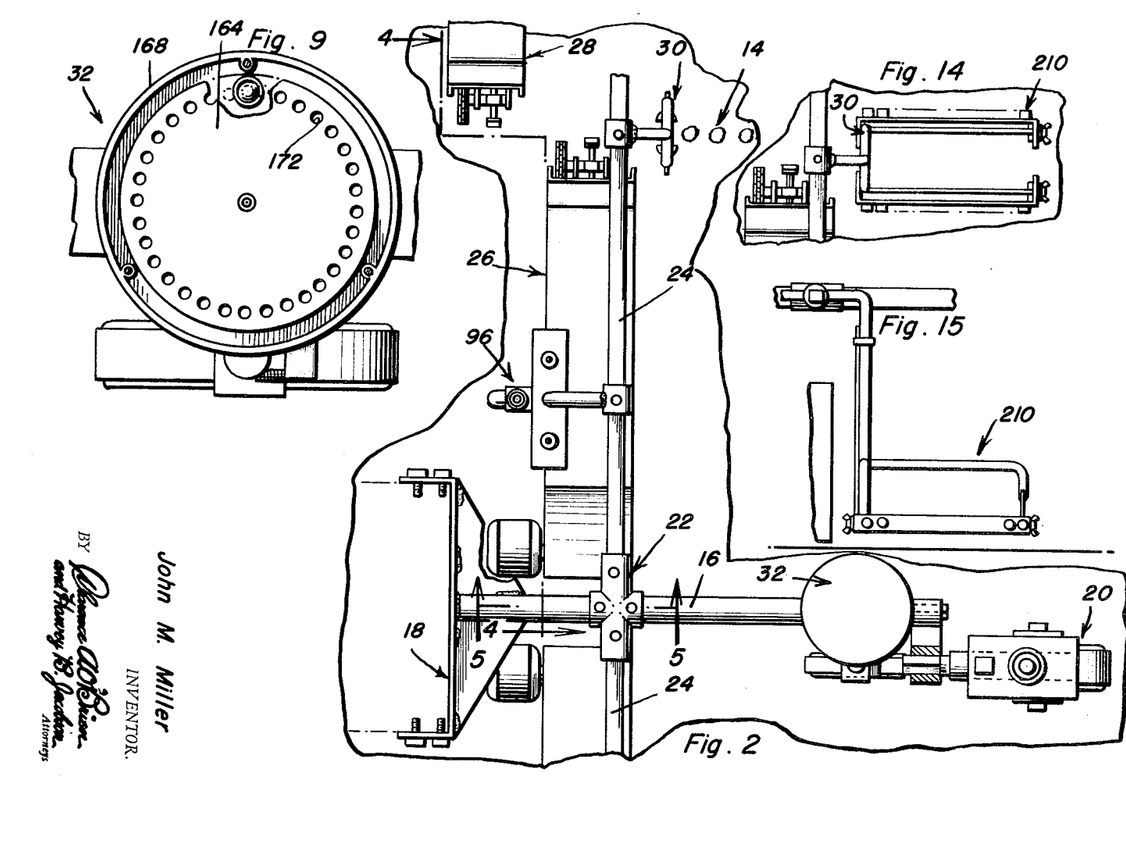
FIGURE 2 is a partial top plan view of the cotton chopping assemblies illustrated in FIGURE 1.
FIGURE 9 is an enlarged partial sectional view with parts broken away taken through a plane indicated by section line 9—9 in FIGURE 7.
FIGURE 14 is a partial top plan view of a modification in the chopper assembly.
FIGURE 15 is a partial side elevational view illustrating the modified feature of the chopper assembly as illustrated in FIGURE 14.
Figure 3:
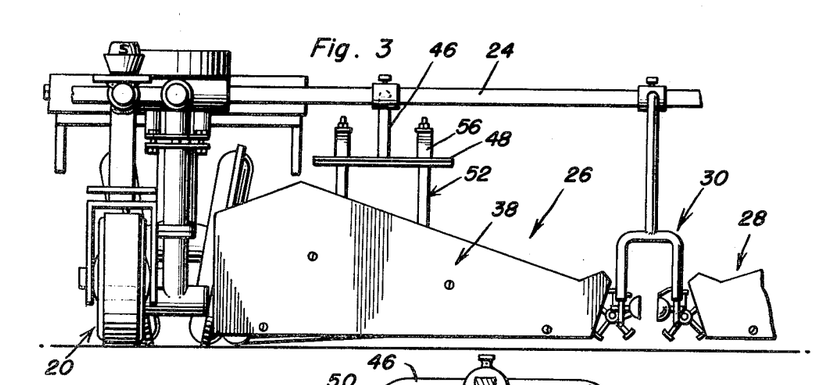
FIGURE 3 is a partial front elevational view of the cotton chopper assembly illustrated in FIGURES 1 and 2.

Referring now to the drawings in detail, attention is initially invited toward FIGURES 1, 2 and 3 illustrating the cotton chopper assembly generally referred to by reference numeral 10 as an attachment to a tractor vehicle 12. It will be observed that the chopper assembly 10 projects forwardly of the tractor vehicle and is adapted to be moved in parallel spaced relation to plant row 14, it being understood of course that the assembly may be laterally extended for accommodating a plurality of plant rows as desired. The chopper assembly 10 therefore involves a main mounting beam 16 disposed in parallel spaced relation to the plant row 14 and secured in a suitable manner to the forward end of a tractor vehicle by means of a hydraulic lift-type mounting bracket assembly 18 suitable for the type or make of vehicle it will be used on. Wheel support is provided for the forward end of the main beam 16 by a supporting caster assembly 20. Connected to the main beam 16 by means of fittings 22, are cross mounting beams 24 that extend transversely of the tractor vehicle across the plant rows. The cross mount beam 24 therefore adjustably supports on opposite sides of the row 14, chopper head assemblies 26 and 28. The chopper head assemblies 26 and 28 are similar in construction to each other but are mounted in spaced relation to each other in a forward direction so as to leave enough space therebetween so as to clear a plant. Also mounted on the cross mount beam 24 in alignment with the plant row 14, is a spacing count control assembly generally referred to by reference numeral 30. Mounted adjacent the forward end of the main beam 16 but rearwardly of the caster wheel assembly, is a spacing control assembly generally referred to by reference numeral 32. It will therefore become apparent, that as the tractor vehicle 12 moves forwardly through the field, the chopping head assemblies 26 and 28 will be intermittently operated to chop or clear the plants in the row 14 leaving selected plants which are spaced a predetermined distance apart. Operational control over the chopping head assemblies 26 and 28 is exercised therefor by both the spacing control assembly 32 and the photocell assembly 30 so as to control the programming of each operational cycle and the overlap of such cycles in order to restrictively chop only vegetation between selected plants. Furthermore, a guidance device 34 such as a magnetic compass may be mounted on top of the caster wheel assembly 20 arranged to automatically steer the vehicle so as to maintain it moving in a direction exactly parallel to the plant rows by correctively turning the vehicle wheels in response to deviation from a preselected direction as sensed by the device 34.

Referring now to FIGURES 4, 5, 10, 11, 12 and 13, the construction of a typical chopping head assembly 26 will be described. The assembly 26 therefore includes a triangular shaped frame 36 to which there is secured a shield 38 having a front face 40, a top rim 42, and side rim 44 providing protection for the mechanism mounted on the chopper head frame 36.

The frame 36 and shield 38 mounted thereon are adjustably spaced in a lateral direction from the main beam 16 by means of the supporting bracket 46 secured to the cross-beam 24 by a setscrew to which bracket 46, top plate 48 is welded or otherwise secured in any suitable manner. Extending upwardly through the plate 48 is a pair of mounting bolts 50 which is secured to an upstanding supporting frame assembly 52 secured to the triangular frame 36. Disposed between the top plate 48 and a washer plate 54 fixed to the mounting bolt 50, are the spring elements 56 compressed under the load of the chopping head assembly 26 for yieldable support thereof in spaced relation above the ground. The assembly 26 is therefore capable of being displaced upwardly in accordance with the irregularities of the ground. Slidably mounted by the triangular frame, is a control rod 58 connected to the armature of a power solenoid device 60 fixedly mounted between the base and vertical leg of the triangular frame 36. The control rod 58 is therefore guidingly supported by a wheel assembly 62 as more clearly seen in FIGURE 12 including spaced rod guide rollers 64 which ride within tracks formed by the angle frame members of the triangular frame 36. Connected to the control rod 58 opposite the armature end thereof, is a chopper wheel 66 rotatably mounted on a shaft 68 to which idler pulley wheels 70 are connected. The shaft 68 is mounted on the portion 72 to which the rod 58 is connected with a spring 74 reacting between the projecting portion 72 and the small end of the triangular frame 36 so as to bias the chopper wheel 66 outwardly. The chopper wheel 66 is therefore provided with cutter blade elements 76 arranged to cut and chop the plants upon rotation of the wheel 66. The wheel 66 is therefore rotated by means of endless drive belts 78 which are entrained about the pulley wheels 70. It will be observed that a pair of such belts 78 is provided with two pulley wheels 70 being connected to the shaft 68 on either side of the chopper wheel 66. The endless belts 78 are therefore entrained about idler pulley wheels 80 rotatably mounted at the right angle portion of the triangular frame 36 and about the drive pulley wheels 82 disposed in vertically spaced relation above the idler pulley wheels 80. A drive shaft is connected to the drive pulley wheel 82 which extends from the drive motor 84. The drive motor 84 is accordingly supported by the frame 36 on the side thereof opposite the front face 40 of the shield 38 as more clearly seen in FIGURE 10. The belts 78 are also entrained about a pair of idler wheels 86 which are supported on slack rod 88. The slack rod 88 is pivotally mounted on the pivot bracket 90 fixed to the control rod 58 as more clearly seen in FIGURE 13. The slack rod 88 also slidably extends through a slack rod pivot member 92 pivotally mounted on a shaft 94 fixed to the hypotenuse portion of the triangular frame 36 as more clearly seen in FIGURE 11. It will therefore become apparent, that when the power solenoid 60 is energized, it will retract the cutter wheel 66 inwardly against the bias of the spring 74 and will also upwardly extend the idler pulley 86 by means of the slack rod 88 so as to maintain the drive belt 78 properly tensioned. Deenergization of the power solenoid 60 on the other hand will enable the the spring 74 to displace the cutter wheel 66 outwardly from the position illustrated in FIGURE 4 so as to move across the plant row while the cutter wheel 66 is being rotated by the drive belt 78. The assembly 26 also is supported in spaced relation above the ground by means of the wheel support assembly 96 which is mounted on the frame and extends therefrom rearwardly of the shield 38, as more clearly seen in FIGURES 1 and 2.

Figure 19:
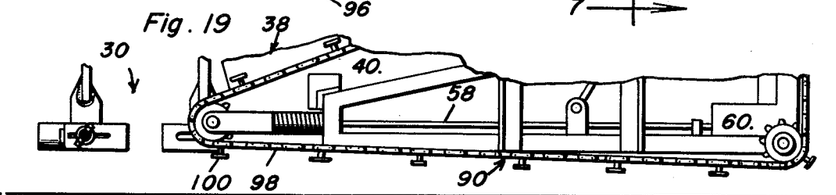
FIGURE 19 is a partial sectional view similar to a portion of FIGURE 4 illustrating a modified form of chopper head assembly.

FIGURE 19 illustrates a modified form of chopping head assembly which differs essentially from that disclosed in FIGURES 1 through 7 in that the drive belt 78 is replaced by a sprocket chain 98 which of course is entrained about sprocket wheels instead of pulleys. A cutter wheel is therefore eliminated inasmuch as the cutting of the plants is performed by means of cutting cleats or blades 100 mounted in spaced relation along the sprocket chain 98. The chopper head as disclosed in FIGURE 19 otherwise is operative and constructed in a manner similar to that described with respect to FIGURES 1 through 7. Both forms of chopper head are therefore operative upon energization of a power solenoid to retract the cutting blades from the plant row. Upon deenergization of the power solenoid, the cutting blades are biased to position extending across the plant row for chopping the plants.

Figures 6, 12, 13, 20, 21, 22, 23:
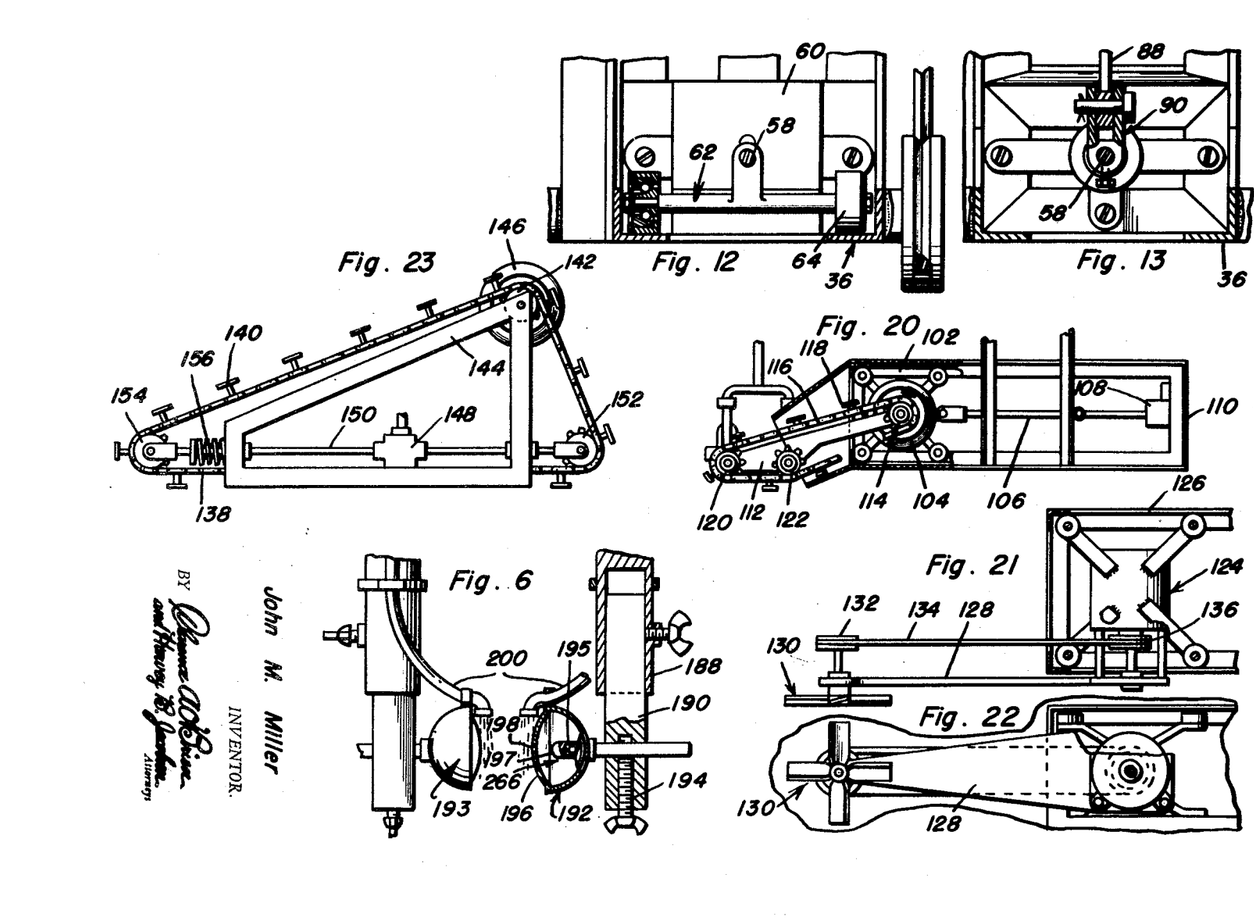
FIGURE 6 is a sectional view taken substantially through a plane indicated by section line 6—6 in FIGURE 5.
FIGURE 12 is a sectional view taken substantially through a plane indicated by section line 12—12 in FIGURE 4.
FIGURE 13 is a partial sectional view taken through a plane indicated by section line 13—13 in FIGURE 4.
FIGURE 20 is a partial sectional view illustrating a second modified form of chopper head assembly.
FIGURES 21 and 22 are partial sectional views illustrating a third modified form of chopper head assembly.
FIGURE 23 is a partial sectional view illustrating a fourth form of chopper head assembly.
Figure 7:
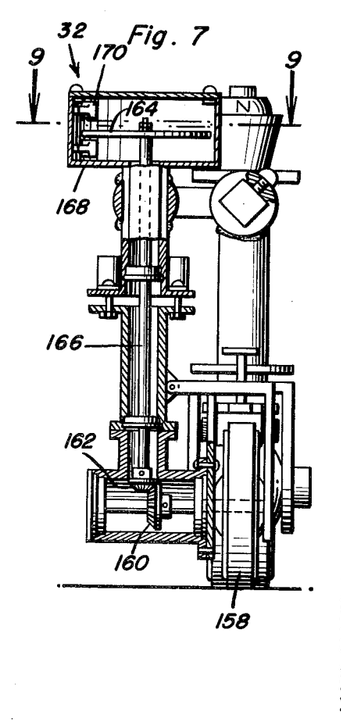
FIGURE 7 is a sectional view taken through a plane indicated by section line 7—7 in FIGURE 1.

FIGURE 20 illustrates a third form of chopper head assembly including a rectangular frame 102 wherein a power driven assembly 104 is slidably mounted and connected to a control rod 106 which in turn is connected to the power solenoid 108 fixedly mounted on the frame 102 at end 110. Projecting from the other end of the frame 102 is a shoe-type cutter assembly 112 including a drive sprocket wheel 114 mounted on the slidable assembly 104 about which there is entrained a sprocket chain 116 to which cutting cleats 118 are connected. The chain 116 is also entrained about the forward idler sprocket 120 and idler sprocket 122. The endless sprocket chain 116 is accordingly maintained continuously operative because of the slidable displacement of the power assembly 104 therewith by means of the power solenoid 108. FIGURES 21 and 22 illustrate another form of chopper head assembly also involving a slidable power assembly 124 displaceable within a frame 126 in a manner similar to that described with respect to FIGURE 20. The power assembly 124, however, mounts a projecting support member 128, the forward end of which rotatably mounts fan type cutter wheel 130. Pulley 132 is connected to the cutter wheel 130 and is belt connected by means of belt 134 to the drive pulley 136 of the power assembly 124. FIGURE 23 discloses a still further form of chopper head assembly which is very similar to the form described with respect to FIGURE 19 in that an endless sprocket chain 138 having spaced cutting cleats 140 mounted thereon is entrained about sprocket wheels including the drive sprocket wheel 142 rotatably mounted by the triangular frame 144 at the upper end thereof to which the drive motor 146 is connected. This form of chopper differs from the others in that the base of the triangular frame 144 mounts a push-pull type of solenoid 148 through which the control rod 150 extends. One end of the control rod has rotatably mounted thereon the idler sprocket 152 while the forward end of the control rod 150 rotatably mounts the forward sprocket 154. The control rod is biased to the outward position by means of the spring 156. The sprocket chain 138 is therefore maintained continuously taut because of the displacement of both idler sprocket wheels 152 and 154. The chopper head assembly of FIGURE 23 is otherwise operative in a manner similar to that described with respect to FIGURE 19.

In FIGURES 1 through 7, the spacing control assembly 32 involves an odometer device having a ground engaging wheel 158 geared by bevel gear 160, bevel gear 162, to the disk 164 connected to the bevel gear 162 by the shaft 166. The odometer housing 168 accordingly mounts detectors 170 cooperating with spaced apertures 172 in the disk 164 as more clearly seen in FIGURES 7 and 9 in order to provide a counting signal by electrical connecting means, in a manner well known to those skilled in the art. Referring therefore to FIGURE 8 in particular, it will be observed that the vehicle moving over the ground will cause rotation of the odometer wheel 158 connected by reduction gearing to the disk 164 thereof so as to provide counting pulses to a power solenoid control circuit 174 by means of which the forward and rear cutting head assembly 26 and 28 may be released for extension and energized for retraction. Thus, the programmed operation of the cutting assemblies will involve the spacing of its phases in proportion to instantaneous rate of movement of the vehicle in this form of the invention. Also, in conjunction with the operation of the chopping head assemblies, the guidance control device 34 which may be in the form of a compass may provide steering control over the vehicle through the steering mechanism 176. The tractor vehicle is therefore provided with a source of electrical power such as the generator 178 as seen in FIGURE 1 connected by electrical conduit 180 to the different operating components forming the control system for operating the chopper head assemblies 26 and 28. Electrical conduits accordingly extend to the power solenoids in the chopping head assemblies, to the drive motors 84, to the odometer device 32 and the guidance device 34. Electrical connection also extends to the plant selecting detector assembly 30 tuned to differentiate between cotton plants and other vegetation such as tall grasses.

Figures 4, 10, 11:
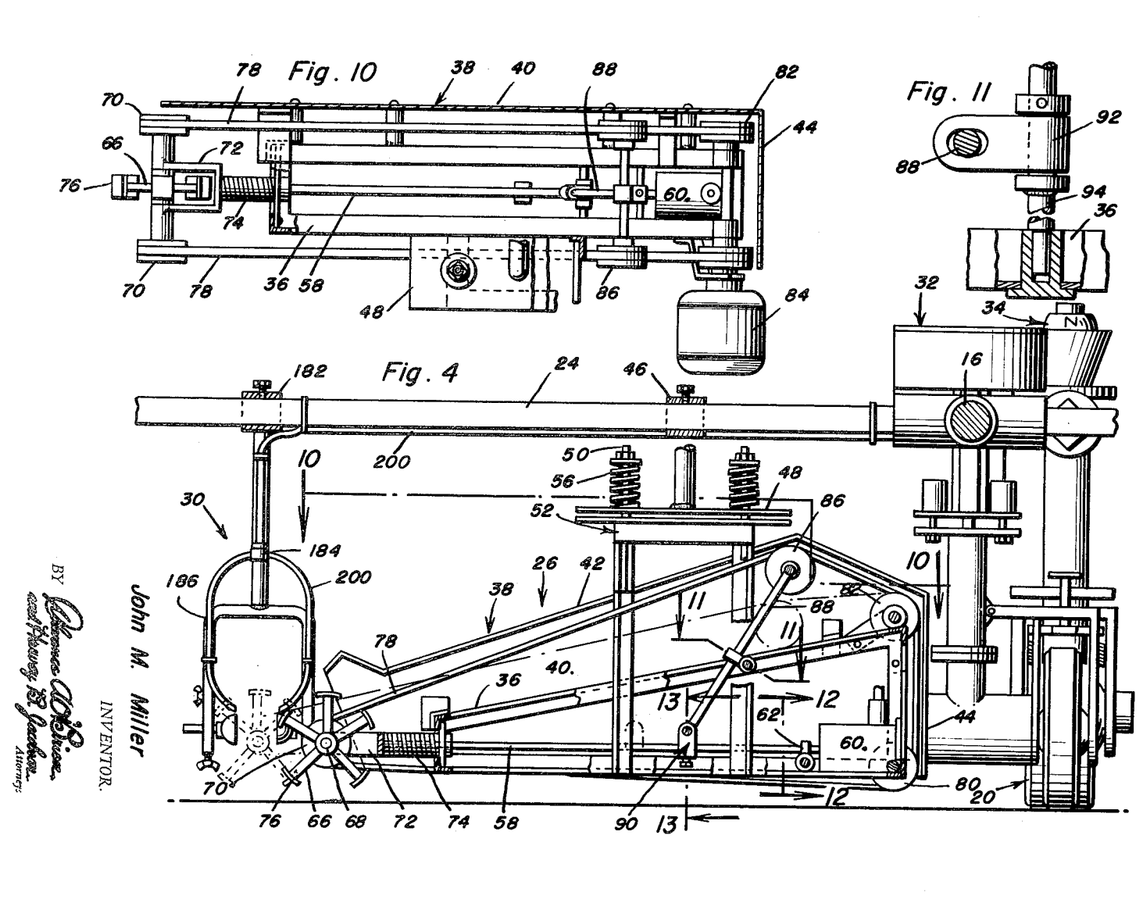
FIGURE 4 is a partial sectional view taken through a plane indicated by section line 4—4 of FIGURE 2.
FIGURE 10 is a partial sectional view taken substantially through a plane indicated by section line 10—10 in FIGURE 4.
FIGURE 11 is a partial sectional view taken substantially through a plane indicated by section line 11—11 in FIGURE 4.
Figure 5:
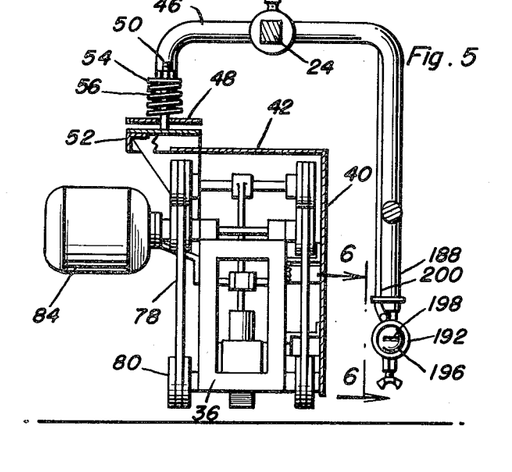
FIGURE 5 is a partial sectional view taken through a plane indicated by section line 5—5 of FIGURE 2.

Referring now to FIGURES 4 and 6 in particular, it will be observed that the detecting assembly 30 is accurately positioned in a lateral direction with respect to the main beam 16 by means of the setscrew lock fitting 182. Connected to the fitting 182 by means of the rod portion 184, is a U-shaped frame member 186 which straddles the plant row or is so adjusted on the cross mounting beam 24 to do so. The U-shaped frame member 186 therefore includes a pair of vertical leg portions 188 which slidably mount in adjustably secured relation, rod members 190. The rod members 190 also have secured thereto in adjustably space relation a lamp unit 193 and a detection unit 192 of the N-P-N silicon photoduo diode type. Wing nut-setscrews 194 are therefore provided in order to lock the lamp and detector units in adjustably spaced relation from the rod member 190. The detector unit includes a front face portion 196 having a slot 198 for receiving a narrow, intense beam of light therethrough from the lamp 193. Each of the units 192 and 193 may therefore be accurately adjusted in proper spaced relation to the plant within the row 14 so that interruption of the beam of light which is emitted from unit 193 impinging on diode 195 through focusing lens 197 may discriminately indicate the presence of a cotton plant. Accordingly, one of the legs 188 of the U-shaped frame member 186 will mount a lamp within its reflector member 192 while the other will mount a photoelectric cell. Also, as more clearly seen from FIGURE 6, each of the legs of the U-shaped straddling frame member 186 mounts tubing 200 from which air under pressure is ejected so as to constantly maintain the face of the lamp and detector units clear of dirt and interfering matter. The tubing 200 may therefore be connected to an air compresser 202 through conduit 204 as more clearly seen in FIGURE 1.

Figures 16, 17, 18:
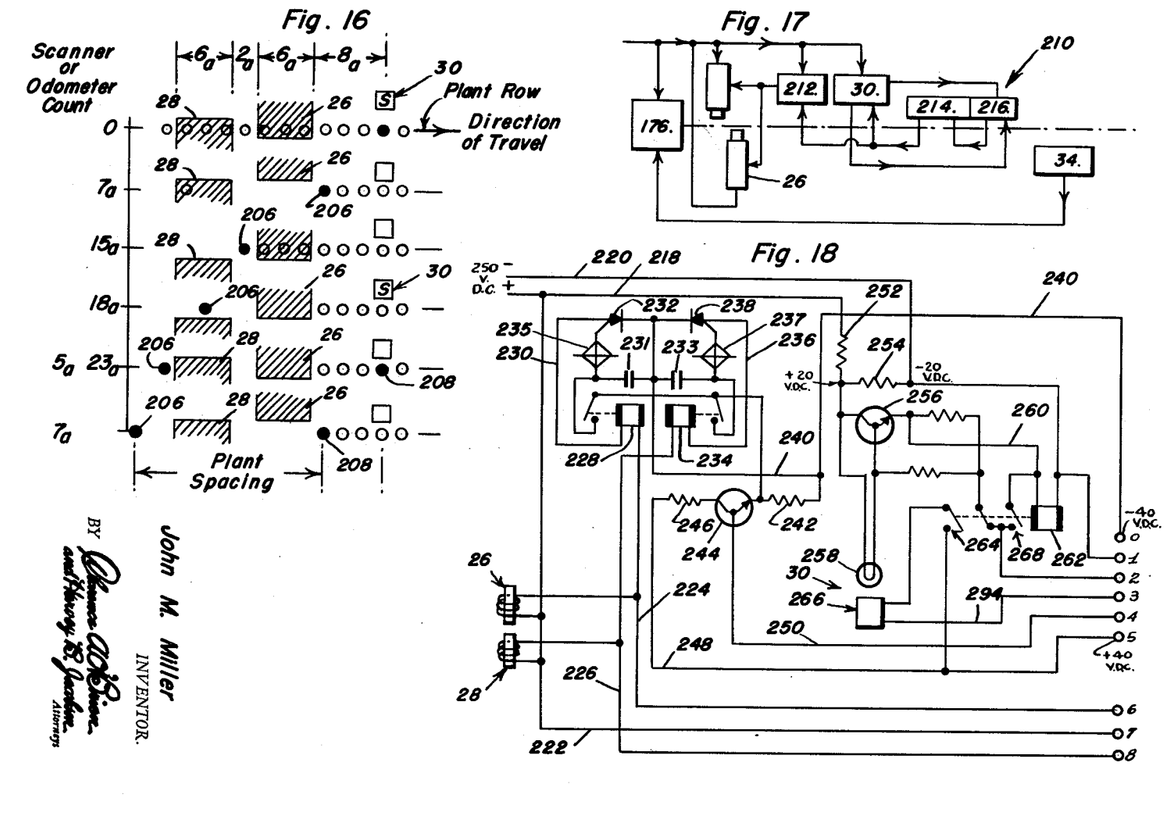
FIGURE 16 is a diagrammatic view illustrating the operational procedure of the present invention.
FIGURE 17 is a diagrammatic illustration of another control system associated with the chopper assembly including the modification of FIGURES 14 and 15.
FIGURES 18 and 18a are circuit diagrams for particularly illustrating the control system of FIGURE 17.

From the foregoing description, the cotton chopper will be operative to perform the objectives of the present invention by a properly operating control system, the components of which have been described. Referring however to FIGURE 16, the operational procedure involved will be described. The plant detector unit 30 is spaced a predetermined distance forwardly of the forward chopping head while the chopping heads 26 and 28 are spaced apart for purposes hereinbefore mentioned. It will also be observed, that the chopping heads have an effective width covering a number of plants. As indicated in FIGURE 16, any convenient phase spacing unit (a) may be selected in order to adjust the control system for operation as desired. As one example, the spacing unit (a) may be ½ inch in which case the effetcive cutting width of the cutting head assemblies will be 3 inches and will be spaced apart by 1 inch while the detector 30 will be spaced 4 inches from the forward cutting head 26. When beginning operation, the detector 30 will be rendered operative to detect a selected plant 206 in the plant row 14 whereupon both chopper head assemblies 26 and 28 will be released so as to block out the plants. Forward movement of the vehicle will accordingly cause clearing of all the plants rearwardly of the selected plant 206 until the counter device or odometer hereinbefore described indicates the movement of a distance of 3½ inches whereupon the forward cutter head 26 is withdrawn so as to clear the selected plant 206. Movement of ½ inch as indicated in FIGURE 16 represents one count. After an accumulative count of 15 the selected plant 206 will be in the space between the chopper heads and the forward chopper head 26 will then be released so as to thereafter block out all the plants forwardly of the selected plant 206, while the rear chopping head 28 is simultaneously withdrawn so as to miss the selected plant 206. After an accumulative count of 18, the chopping heads remain unaffected but the detector 30 is rendered operative to detect a plant starting a second overlapping cycle in order to select a second plant 208. The detector 30 is therefore then operative to initiate a second count in the spacing control assembly 32. When the first accumulative count is 23, the first selected plant 206 will have passed the rear chopping head assembly 28 and the first cycle is completed whereupon the rear chopping head assembly 28 is released for extension so as to assure blocking out of all vegetation forwardly of the selected plant 206 by rechopping. When the previously initiated second count arrives at 7, the second selected plant 208 will have arrived at the first forward chopping head 26 at which time it will be withdrawn. The second cycle is then completed with respect to the selected plant 208 so as to leave a plant spacing of predetermined value between the selected plants 206 and 208. With the use of the odometer device 32, as the space counting control, it will be appreciated, that each count will proceed at a rate that depends upon equal ½ inch displacements (a) of the vehicle with respect to the ground that will be started by the sensing of a plant a predetermined distance of 4 inches (8a) in front of the forward chopper so that two counting cycles will overlap in distance in accordance with deviations of plants from the desired spacing in order to correlate operation of the chopper assemblies with these deviations.

Figure 18A:
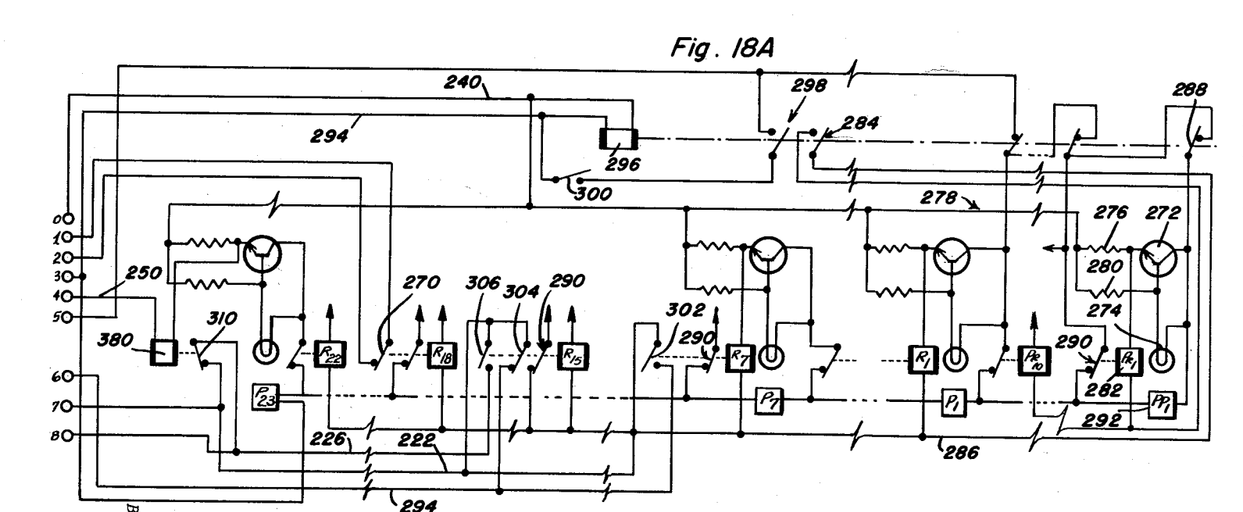

Another form of space counting control system may be utilized replacing the odometer device 32 by a scanner assembly which is mounted on and extends forwardly of the detector assembly 30 as more clearly seen in FIGURES 14 and 15. The scanner assembly generally referred to by reference numeral 210 includes a plurality of photocell detectors and photocell lamps aligned with each other on opposite sides of the plant row and closely spaced apart by a spacing unit such as ½ inch aforementioned. The scanner assembly 210 will therefore be operative to render a count in response to movement of the vehicle relative to the plant so as to more accurately exercise spacing control over the chopper head assemblies 26 and 28. Referring therefore to FIGURE 17, it will be observed that the forward and rearward chopper heads 26 and 28 are controlled by a program control circuit 212 which is under the control of the timing portion 214 of the scanner assembly 210. The detector circuit 30 is also under control of the timing portion 214 and in turn initiates operation of the timing portion 214 through the pilot portion 216 thereof. The pilot portion in turn determines when operation of the scanner portion 214 begins. The pilot portion 216 of the timing assembly is operative to delay operation of the scanner in accordance with the spacing of plants in the row preceding the scaner. As a result thereof, the chopper head assemblies 26 and 28, will be operated so as to vary the spacing between selected plants in accordance with the plant spacing condition forwardly of the chopper since the count proceeds at a rate dependent not only on displacement of the vehicle but also on the continued sensing of plants forwardly of the selected plant. The circuitry for the program control, the detector control, the timing and pilot portions of the scanner assembly, are shown in FIGURES 18 and 18a. It will be observed in FIGURE 18, that power from any suitable power source mounted on the tractor may be supplied through the power line 218 and 220. The power line 218 is connected by line 222 to one terminal of the power windings associated with each of the chopping head assemblies 26 and 28. The other terminals of the power windings are respectively connected to conductors 224 and 226. Conductor 224 is connected to the solenoid relay coil 228 which in turn is connected by conductor 230 to the silicon controlled solenoid driving rectifier 232. The conductor 226 on the other hand is connected to the relay coil 234 which is in turn connected by conductor 236 to silicon controlled rectifier 238. Energization of either of the chopper head solenoids will thus be effective to establish a balanced voltage in conductor 240. Since the signal output of photo diode 258 is in the neighborhood of 100 ma., and the turn-on current of the silicon controlled rectifier 232 is a maximum of 10 milliamperes, an amplifier circuit is required to build up the signal by this amount. Thus, when the light path to the photodiode 258 is interrupted, the transistor 256 turns off. This in turn causes transistor 244 to turn off, allowing the capacitor 231 or 233 to charge toward 40 v. D.C. The Shockley diode 235 or 237 fires at between 26 and 36 v. D.C., sending a current pulse from the capacitor into the silicon controlled solenoid driving rectifier 232 or 238 sufficient to fire the silicon controlled rectifier to activate chopper assembly 26 or 28. After the solenoid has been activated, the plus 250 v. D.C. supply must then be removed to reset the circuit. Conductor 240 is connected through a voltage dropping resistor 242 to the emitter of a transistor 244. Resistor 246 therefore connects the collector of the transistor to the conductor 248 establishing a predetermined D.C. voltage between the conductors 248 and 240. Also, when the proper bias is applied to the base of the transistor 244 through conductor 250, the transistor 244 is rendered conductive in order to render the scanner assembly operative as will hereafter be described.

The detector control circuit is supplied with a reduced voltage from the power line 218 and 220 by means of the voltage dropping resistor 252 and the current limiting resistor 254. The resistor 252 is therefore connected to the collector of the transistor 256 and also to the filament of the photocell lamp 258. The filament of the lamp is connected to the base of the transistor 256 so that it may be properly biased rendering it conductive causing flow of current from the collector to the emitter connected to the conductor 260 and through the relay coil 262 to the power line 220. Supply of voltage to the power lines 218 and 220 will therefore render the transistor 256 conductive, energizing the lamp 258 and the relay coil 262. Energization of the relay coil 262 closes the normally open relay switch 264 so as to establish a circuit through the photocell unit 266 of the detector assembly 30. Also, a holding circuit is established by closing of the switch 268 through the relay coil 262. The holding circuit for the relay coil 262 includes therefore the normally closed switch 270 as seen in FIGURE 18a.

FIGURE 18a illustrates scanner assembly circuits which include in the described example, ten pilot detector units spaced apart one-half inch followed by twenty-three scanner detector units also spaced apart one-half inch.

The forward pilot detector unit for example, includes a transistor 272 the collector of which is connected to the filament of the lamp 274 which in turn is connected to the base of the transistor. The emitter of the transistor is connected through resistor 276 to the conductor 278 which in turn is connected to the conductor 240 from the negative potential on the emitter of the transistor 244. A negative potential is therefore applied to each of the emitters in each of the detecting units of the scanner assembly also having a transistor 272 as described with respect to the first detector unit of the pilot portion of the scanner assembly. A proper bias is therefore applied to the base of the transistors 272 through the resistor 280. Each of the detector units also has associated therewith a relay coil 282, one terminal of which is connected to the emitter of the transistor so as to energize the relay 282 when the transistor 272 is conductive. The other terminals of the relay coils 282 in the detector units of the pilot portion of the scanner assembly, are connected through the normally open relay switch 284 to the conductor 286 so that they may be disabled while the detector unit relay coils in the timing portion are permanently connected to conductor 286. The ten pilot detector units are also provided with a normally closed relay switch 288 that conductively connects the collector of the transistor to the normally closed relay switch 290 also connected to the collector of the following detector units. Parallel circuits are thereby established through the detector photocells 292 associated with each of the detector units. The positive potential of the transistor 244 is therefore connected to the bank of normally closed switches 288 through the conductor 248. Also, activated photocell detector 266 of the plant detector assembly 30 supplies the positive potential of line 248 to line 294 when the relay switch 264 is closed so as to energize the control relay coil 296 for opening the bank of switches 288 and closing the switch 284. Energization of the relay coil 296 also closes the switch 298 so as to establish a holding relay circuit therethrough when the limit switch 300 is closed. The limit switch 300 is therefore maintained closed but opened when the chopper reaches the end of a plant row. Each of the detector units is similar to each other except that the detector units in the scanner portion do not have their collectors interconnected by any relay switches such as the relay switches 288 associated with the pilot detector units. Furthermore, the relay coil R7 of the seventh scanner unit in addition to controlling its normally closed relay switch 290 also is operative to control a normally open relay switch 302. The switch 302 is connected across the terminals of the energizing solenoids associated with the forward cutter head assembly 26 so that when the switch 302 is closed the cutter head 26 will be activated when its associated silicon rectifier fires so as to energize the solenoid coil to effect extension of the cutter head. The normally opened switch 302 is therefore connected to the lines 222 and 224. The fifteenth scanner detecting unit also includes a relay coil R15 which in addition to the usual normally closed relay switch 290 also includes a normally closed relay switch 304 connected across the lines 222 and 224 so as to establish a shorting circuit for the first cutter head assembly 26 despite the open condition of the switch 302 associated with the relay coil of the seventh scanner detecting unit. The fifteenth relay coil also includes a normally opened relay switch 306 connected across the lines 222 and 226 to effect the activation of the second cutter head solenoid coil, when closed. The eighteenth scanning unit has associated with its relay coil R18, the normally closed relay switch 270 before mentioned so as to establish the relay coil holding circuit for the relay coil 262 of the control circuit of the detector assembly 30. The final or 23rd scanning detector unit does not have associated therewith the usual relay coil but instead has the emitter of its transistor connected to the release relay coil 308 which in turn is connected to the conductor 250 applying the proper bias to the base of the transistor 244. Thus, when the final detecting unit circuit is deenergized, the normally closed relay switch 310 will be closed so as to establish a circuit across the second chopper head solenoid coil since the switch 310 is connected between the lines 226 and 222.

Summarizing operation of the control circuit of FIGURES 18 and 18a, it will be noted that when a 250 D.C. voltage is applied to the power lines 218 and 220, it will be reduced by the resistor 252 so as to apply the reduced positive voltage to the collector of the transistor 256 and through the filament of the lamp 258 apply a bias to the base thereof. The transistor 256 is rendered conductive thereby, so that current flows through the conductor 260 through the relay coil 262 back to the return power line 220. The relay coil 262 is thereby operative to actuate the relay switches 264 and 268. Closing of the switch 268 is operative through the normally closed relay switch 270 of FIGURE 18a, to establish a holding circuit through the relay coil 262. The closing of the switch 264 is operative to supply a positive voltage from the line 248 through the activated photocell unit 266 to the line 294. Also, the line 222 connected to the power line 218 would establish energizing circuits through the solenoid coils of the chopper heads 26 and 28 if the switch 310 were open, the switch 302 open, the switch 304 open and the switch 306 open. In any event, a reduced voltage will also be supplied through the resistor 242 to the emitter of the transistor 244 so as to establish a reduced voltage between the lines 240 and 248 in order to render the scanner assembly operative. With the control circuit of the detector assembly 30 operative, activating the photocell 266, positive potential from the line 248 is supplied to the line 294 so as to energize the relay coil 296. It will be observed that all of the photocell units 292 associated with each of the detector units are connected in series with each other with the last photocell P23 being connected to the line 294 which in turn has been connected to the positive potential line 248. Accordingly, a positive potential will be applied to the collector of each of the transistors 272 through the normally closed relay switches 290 associated with each detector unit. The emitter of each of the transistors 272 being connected through the resistor 276 to the line 278 will thereby establish a circuit inasmuch as the line 278 is connected to the negative potential line 240. Each of the detector units will thereby be energized so as to also energize the lamp filament 274. When a plant blocks the light between the lamp 274 and its photocell 292 in the pilot portion of the scanner assembly, the associated transistor 272 is cut off. The associated relay coil 282 is thereby also deenergized so as to close the relay switch 290 of the following detector unit causing it to be activated. It will be appreciated, that the sequential activation of each of the detector units rearwardly of the first detector unit cut-off by sensing of a plant, will cause energization of the associated relay coil so as to open the switch 290 associated therewith in order to prevent operation of the following detecting unit at the same time. Cut-off of the following detecting unit will then occur either by the same plant sensed by the previous detecting unit or by another plant closer thereto so that the speed of the count in the pilot portion depends on the spacing of the plants before thinning. It will therefore be apparent, that at the beginning of the count the switch 310 will be opened so as to remove the shorting circuit from the rear chopper head assembly 28.

However, the switch 302 will be closed so as to fire the silicon controlled rectifier 232 activating the chopper head solenoid 26 while the switch 306 will also be closed to fire the silicon controlled rectifier 238 energizing the solenoid coil of the chopper head assembly 28. Both of the chopper heads will therefore be extended at the beginning of the count. The count will therefore proceed into the timing portion from the pilot portion. Each count in the timing portion must proceed to completion during which programming relays R7, R15, R18 and 308 perform their respective functions as the vehicle moves forwardly.

When the relay coil of the seventh scanner detecting unit is deenergized as a result of the proceeding count, the switch 302 is closed so as to fire the rectifier 232 of the solenoid coil of the forward chopping head assembly 26 whereupon the chopping head assembly 26 is withdrawn as desired with respect to FIGURE 16 on the seventh count. The count then proceeds until the relay coil of the fifteenth scanner detecting unit is deenergized whereupon the open switch 302 is by-passed by the closing of the switch 306 so as to cause extension of the forward chopper head 26 while at the same time opening of the switch 304 opens the circuit for the second chopper head 28 for retraction thereof as described with respect to FIGURE 16. On the eighteenth count, the relay coil R18 is deenergized so as to open the switch 270 whereupon the holding circuit for the relay coil 262 is opened for deenergization of the control circuit associated with the detector assembly 30 which also disables operation of the pilot portion by de-energizing relay 296 so as to stop any count initiated after the first count from proceeding into the timing portion until the detector 30 senses the next plant. The detector assembly 30 is thereafter operative to start a new count through the scanner assembly as hereinbefore described. Finally, when the first count has arrived at the 23rd detecting unit, the relay coil 308 will be deenergized so that the normally closed switch 310 will be closed activating the previously energized solenoid coil for the second chopper head 28. The second chopper head is thereby released.

It will therefore be apparent, that the count effected by the scanning unit will be varied in accordance with that pilot detecting unit first to sense a plant when the detector assembly 30 signals the beginning of a count, so that the count proceeding through the timing portion will be delayed by an amount predetermined in the pilot portion. Also, should there be an excessive gap in the plant row prior to thinning thereof, the count will be delayed until interruption of a pilot detector unit occurs. Accordingly, delay will occur in the blocking of the plant by the chopping head so as to accommodate the variations in the plant spacing prior to thinning. The novel control system will therefore be particularly useful in connection with the chopping assembly arrangement described.

When using the scanner timer, small sticks or small wires will have to be placed at the opposite ends of the row being chopped, approximately fifteen inches therefrom so that the last plant can be cleared of vegetation. In other words, the stick or wire acts as a plant for signaling purposes. Also, if the farmer has skips in his rows, where plants did not come up, he will have to put a stick or wire approximately fifteen inches in advance of the last plants defining the gap in the row.

When using the odometer timing device, disc 164, will have to be properly calibrated and the photocell will be wired to a collecting relay that adds up to the designed spacing of the count and when the relay has accumulated enough signals it fires the counting relay. Thus, by using small apertures 172 in the disc counts up to small fractions of an inch may be obtained. As an alternative, the same circuit that is used in the front or first ten photocells of the scanner timer could be used with as many photocells as necessary, so as the disc revolves and contact is made a positive timing system will be realized operating in a manner similar to the forward section or the ten first circuits of the scanner timer.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An electronic cotton chopper adapted to be mounted on a tractor vehicle or the like comprising, mounting means projecting forwardly of a vehicle for movement in parallel spaced relation to rows of plants, plant cutter means movably mounted by the vehicle in laterally spaced relation to a plant row on opposite sides thereof for displacement across the row, plant detecting means mounted on the mounting means forwardly of the cutter means for sensing plants a predetermined distance forwardly of the cutter means, spacing control means mounted on the mounting means and operatively connected to the detecting means for initiating overlapping operative cycles in response to said sensing of plants by the detecting means, and cutter operating means operatively connected to the cutter means and the spacing control means for sequential displacement of the cutter means during each of said overlapping cycles to chop plants forwardly and rearwardly of selected plants in the row, said cutter means comprising, a pair of independently displaceable plant chopper assemblies disposed on opposite sides of said row and spaced from each other in a forward direction a distance exceeding a single plant but less than two plants.

2. The combination of claim 1, wherein each chopper assembly includes a chopper frame, blade means movably mounted on the frame, drive means mounted on the frame and operatively connected to the blade means for cutting movement thereof and power means mounted on the frame and operatively connected to the drive means for displacement of the blade means.

3. The combination of claim 2, wherein said drive means comprises endless flexible means rendered operative in response to displacement thereof by the power means.

4. The combination of claim 3, wherein said blade means includes cutter formations mounted in spaced relation on said endless flexible means.

5. The combination of claim 4, wherein said cutter operating means comprises cutter retraction means operatively connected to the cutter means energized for withdrawal of the cutter means from the plant row, means responsive to detection of selected plants by the detecting means in predetermined spaced relation forwardly of the cutter means to initiate counting by the spacing control means and deenergize the retraction means for plant chopping rearwardly of a selected plant, means responsive to predetermined intermediate counts by the spacing control means to intermittently energize and deenergize the retraction means for chopping plants forwardly of said selected plant and means responsive to a spacing count by the spacing control means for deenergizing said retraction means for chopping rearwardly of another selected plant.

6. The combination of claim 5, wherein said plant detection means comprises a photo-cell unit periodically rendered operative by the spacing control means for selection of plants missed by the cutter means as the vehicle moves forwardly.

7. The combination of claim 6, wherein said spacing control means comprises, plant scanning means rendered operative to supply counting signals to the chopper control means and pilot means operative simultaneously with the detecting means to render the scanning means operative in response to the presence of plants within a predetermined distance forwardly of the scanning means.

8. An electronic cotton chopper adapted to be mounted on a tractor vehicle or the like comprising, wheel mounting means projecting forwardly of a vehicle for movement in parallel spaced relation to rows of plants, plant cutter means movably mounted by the mounting means on opposite sides of a plant row for displacement across the row, plant detecting means mounted on the mounting means forwardly of the cutter means in straddling relation to said plant row, spacing control means mounted on the mounting means forwardly of the detecting means and rendered operative by the detecting means to initiate operating cycles, and chopper control means operatively connected to the cutter means and the spacing control means for sequentially timed displacement of the cutter means during said cycles of the spacing control means, said cutter means comprising a pair yieldably mounted plant chopper assemblies disposed on opposite sides of said row and spaced from each other in a forward direction a distance exceeding a single plant but less than two plants, each chopper assembly including a chopper frame, blade means movably mounted on the frame, drive means mounted on the frame and operatively connected to the blade means for cutting movement thereof and power means mounted on the frame and operatively connected to the drive means for displacement of the blade means, said drive means being displaceable and including a rotary cutter head.

9. An electronic cotton chopper adapted to be mounted on a tractor vehicle or the like comprising, mounting means projecting forwardly of a vehicle for movement in parallel spaced relation to rows of plants, plant cutter means movably mounted by the mounting means on opposite sides of a plant row for sequential displacement across the row of plants during an operative cycle, plant selecting means rendered effective to sense plants a predetermined distance forwardly of the cutter means for initiating said operative cycle, spacing control means responsive to movement of the vehicle for periodically rendering the plant selecting means effective to sense the plants during said operative cycle, said spacing control means including plant scanning means operative in response to movement of the vehicle relative to the plants, and pilot means operatively connected to the scanning means to render the scanning means operative only in response to the spacing of plants a predetermined distance forwardly thereof.

10. In combination with a cutter assembly periodically energized and deenergized to destroy plants in a row adapted to be thinned, means for controlling the instant and duration of energization of said cutter assembly in response to movement thereof in a direction parallel to said row of plants comprising; programmed means operatively connected to the cutter assembly for sequential energization and de-energization thereof, counter means operatively connected to the programmed means for producing a predetermined number of spaced signals when operated to program the programmed means, spacing control means operatively connected to said counter means for spacing said signals in accordance with the rate of movement of the cutter assembly, sensing means operatively connected to said programmed means and rendered operative by one of said spaced signals for initiating operation of the counter means in response to detection of a plant a predetermined distance forwardly of the cutter assembly in said direction of movement, and pilot scanning means operatively connected to said sensing means and intermittently rendered operative for variably delaying said operation of the counter means in accordance with plant spacing conditions forwardly of the sensing means in said direction of movement of the cutter assembly.

11. The combination of claim 10, wherein said spacing control means includes, plant scanning means operative to space said signals in accordance with a counting rate initiated by the pilot scanning means.

12. In combination with a vehicle adapted to move forwardly in a direction parallel to a row of plants, means mounted on said vehicle for removing vegetation from said row of plants between selected plants in said row spaced a predetermined distance apart comprising, at least two cutter assemblies disposed in the path of the plants for removal of vegetation, plant sensing means on said vehicle forward of the cutter assemblies, and means responsive to the intermittent sensing of plants by said plant sensing means a predetermined distance forwardly of the cutter assemblies for sequential displacement of the cutter assemblies from the path of the selected plants, each of said cutter assemblies including, cutter frame means operatively mounted for displacement in a direction transverse to said plant row, continuously moving means operatively mounted on said frame means and rigid blade means fixedly mounted on said continuously moving means for engagement with plants in said row.

13. The combination of claim 12, wherein the frame means of said cutter assemblies are alternatively displaced under control of the intermittent sensing means in opposite directional senses to bring the rigid blade means out of the path of the selected plants relative to the vehicle.

14. In a photoelectric system for effecting programmed operations of devices for eradicating plants in response to light responses, an elongated assembly having a plurality of equally spaced detecting units, a source of light carried by each of said units, means for successively rendering each of said detecting units operative in response to interruption of a beam of light received by a preceding unit from the source of light associated therewith, whereby successive sensing of said plants by the detecting units proceeds at a rate dependent upon the spacing of the plants and relative movement between the plants and the elongated assembly, means operatively connected to one of said detecting units for rendering any one of a group of equally spaced detecting units of said plurality of detecting units operative to begin said successive sensing of the plants, means operatively connected to another group of unequally spaced detecting units different from said first-mentioned group for forming signal pulses, and electromagnetic means operatively connected to receive said signal pulses to effect said programmed operations of the plant eradicating devices.

15. An electronic plant thinning assembly adapted to be mounted on a vehicle comprising, a pair of independently operated plant eradicating devices mounted by the vehicle for movement along opposite lateral sides of a row of plants, said plant eradicating devices being fixedly spaced from each other in the direction of vehicle movement by a distance exceeding the thickness of each of said plants but less than the thickness of two of said plants, plant detecting means operatively mounted by the vehicle for sensing plants a predetermined distance forwardly of the plant eradicating devices, spacing control means operatively connected to the detecting means for initiating overlapping operational cycles in response to sensing of plants by the detecting means, and operating means operatively connecting the spacing control means to the plant eradicating devices for programmed operation of said devices during the overlapping operational cycles to eradicate vegetation forwardly and rearwardly of selected plants in said row.

16. A plant thinning assembly adapted to be mounted on a vehicle for movement forwardly in a direction parallel to a row of plants to be thinned, comprising; vegetation eradicating means operatively mounted on opposite lateral sides of said row of plants for eradicating vegetation in the row during an operational cycle, plant selecting means rendered effective to sense plants in said row a predetermined distance forwardly of the vegetation eradicating means for initiating said operational cycle, plant scanning means responsive to movement of the vehicle for periodically rendering the plant selecting means effective during said operational cycle, and pilot means operatively connected to the scanning means for rendering the scanning means operative only in response to the spacing of plants a predetermined distance forwardly of the scanning means.

References Cited by the Examiner

UNITED STATES PATENTS

| | | | |
|---|---|---|---|
| 2,177,803 | 10/39 | Ferte et al. | 172—6 |
| 2,502,468 | 4/50 | Marihart | 172—6 X |
| 2,592,689 | 4/52 | Hann | 172—6 |
| 2,617,048 | 11/52 | Wagner et al. | 250—209 |
| 2,864,292 | 12/58 | Elliott et al. | 172—6 |
| 2,894,178 | 7/59 | Chesebrough et al. | 172—6 X |
| 2,954,476 | 9/60 | Ghandhi | 250—209 |
| 3,027,950 | 4/62 | Cascarine | 172—38 X |

ABRAHAM G. STONE, *Primary Examiner.*

A. JOSEPH GOLDBERG, *Examiner.*